J. J. McGUIRE & H. H. GRAHAM.
POWER TRANSMISSION APPARATUS.
APPLICATION FILED JULY 9, 1909.

990,999.

Patented May 2, 1911.

Witnesses:

Inventors:
John J. McGuire
Harry H. Graham

UNITED STATES PATENT OFFICE.

JOHN J. McGUIRE, OF CHICAGO, AND HARRY H. GRAHAM, OF OAK PARK, ILLINOIS.

POWER-TRANSMISSION APPARATUS.

990,999.

Specification of Letters Patent.

Patented May 2, 1911.

Application filed July 9, 1909. Serial No. 506,656.

*To all whom it may concern:*

Be it known that we, JOHN J. McGUIRE and HARRY H. GRAHAM, citizens of the United States, residing at Chicago and Oak Park, respectively, in the county of Cook and State of Illinois, have invented certain new and useful Improvements in Power-Transmission Apparatus, of which the following is a specification.

Our invention relates to power transmission apparatus intended particularly for printing presses driven by electric motors, though adaptable to other machinery; and the invention has for its object to provide certain new and useful improvements in apparatus of this sort.

In driving printing presses it is desirable to employ two motors, one, the principal motor for driving the press at its normal high speed, the other, a secondary motor, preferably of considerably lower power, for starting up the press, or for driving it at low speed, as for example, in washing or repairing.

The object of our invention is to provide a simple, convenient and economical form of apparatus for coupling up these principal and secondary motors with the main driving shaft of the press, or other piece of machinery, in such manner that the secondary motor can be used alone, when desired, but will be automatically disconnected when the principal motor has been set in operation and has produced a speed in excess of the speed produced by the secondary motor. Thus the secondary motor, which is preferably a small motor connected to the shaft which it drives by a train of speed reducing gears, may be used to start up the press. After a certain speed has been reached, the principal motor can be set in operation, and when the latter has taken up the load, the smaller motor will be automatically cut out before the normal running speed of the press has been attained. This arrangement results in an economy of power in starting, obviates the use of complicated starting apparatus for the larger or principal motor and minimizes the danger of burning this motor out when it is first set in operation.

The invention has for further objects such other new and improved devices, arrangements and constructions in power transmission apparatus as will be described in this specification and particularly set forth in the claims appended thereto.

A preferred embodiment of the invention is shown in the accompanying drawings, wherein—

Figure 1:
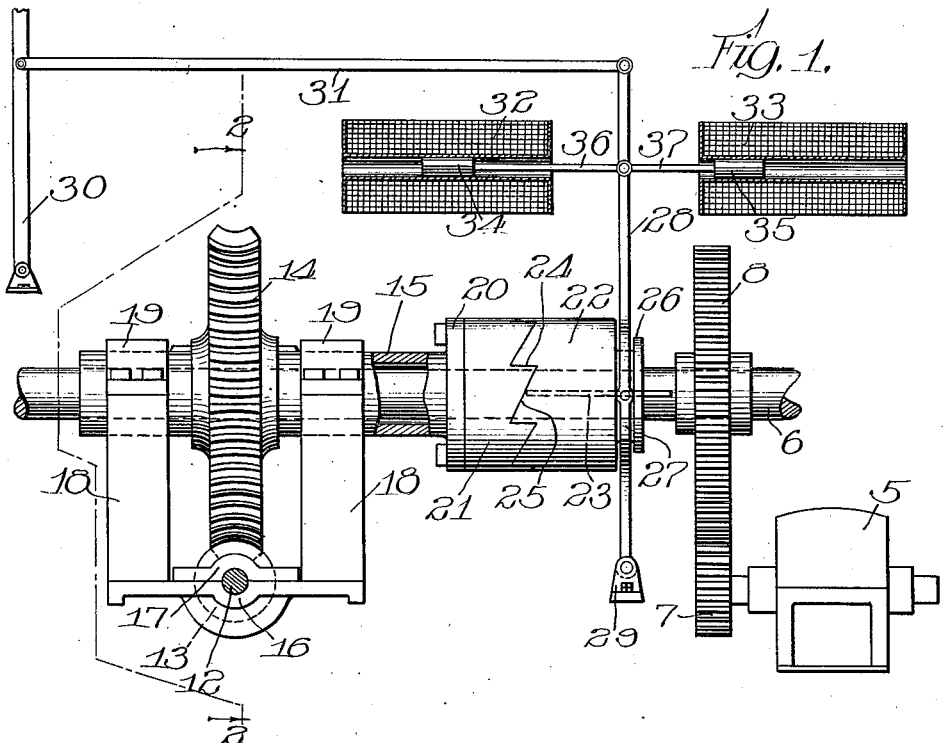
Figure 2:
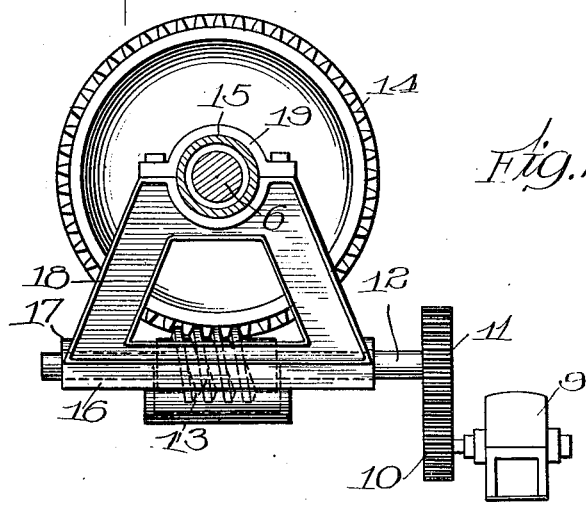

Figure 1 is a side elevation of the apparatus with a part in section, and Fig. 2 a sectional view taken on line 2—2 of Fig. 1.

Like characters of reference indicate like parts in the several figures of the drawings.

Referring now to the drawings, 5 represents the principal motor which is shown as connected to the shaft 6 by the gears 7 and 8.

9 is a smaller motor which is connected by gears 10 and 11 with the shaft 12 of a worm 13 which meshes with a worm 14 on a hollow shaft 15 which surrounds a portion of shaft 6. Shaft 6, it will be understood, turns in suitable bearings and is connected in any manner that may be desired with the printing press or other machine which it is intended to drive. These connections are not shown, as in themselves they form no part of my invention. The worm 13 is shown as journaled in suitable bearings formed by the castings 16 and 17. On the former are the standards 18 which with the castings 19 form bearings for the hollow shaft 15. It will be seen that the gears 10, 11 and the worms 13 and 14 are so proportioned as to very considerably reduce the speed of revolution of shaft 15 relative to the shaft of motor 9.

The hollow shaft 15 terminates in a boss 20, bolted to which is one member 21 of a clutch, the other member of which 22 is slidably arranged upon shaft 6, but coupled therewith as to prevent rotation thereon by the feather 23. The clutch members 21 and 22 are formed on their engaging edges with teeth and corresponding notches, one of the surfaces 24 constituting each of said teeth or notches being preferably parallel with the axes of the clutch members and the other surface 25 being oblique thereto.

The movable clutch member 22 is preferably constructed with the collar 26 for the forked portion 27 of a lever 28, pivoted to the stationary part 29.

30 is an operating lever connected with lever 28 by the connecting rod, or the like, 31. 32 and 33 are solenoids, the cores of which 34 and 35 are pivotally connected with the lever 28 by the rods 36 and 37 respectively.

We do not limit ourselves to the exact devices, constructions and arrangements shown as modifications might be devised which would come within the scope of our invention as defined by the claims.

The operation of the apparatus is as follows: Supposing shaft 6 to be the main driving shaft of a printing press, if it be desired to start the machine, current will first be supplied to motor 9, which motor is of small power but which, because of the fact that it is connected with the hollow shaft 15 by the train of reducing gears, easily sets the press in motion. After the small motor has thus gotten the press started, current is sent to the large motor 5 which is connected with shaft 6 so as to normally drive the press at a speed far in excess of the speed which can be produced by the small motor. The engaging edges of the clutch members 21 and 22 are so formed as to transmit power from member 21 to member 22, supposing the parts to be revolved in the direction indicated by the arrow in Fig. 1, but not from member 22 to member 21. Therefore when the speed of shaft 6 and clutch member 22 exceeds the speed of the hollow shaft 15 and the clutch member 21, clutch member 22, because of its feathered connection and capacity to move longitudinally on shaft 6, will ride out of engagement with clutch member 21, thus disconnecting the small motor 9 from shaft 6. The small motor will thereupon be shut down in any desired manner, either automatically or otherwise.

The clutch member 22 may be arbitrarily shifted on shaft 6 by the operating lever 30 or by means of the solenoids 32, 33.

The arrangement by which the small motor is coupled up to the shaft 6 has another advantage. For reasons well known, it is undesirable to reverse a printing press by reversing its motor. It sometimes is necessary, however, to reverse the press, for example, when it is being run at low speed for cleaning. With the power transmission apparatus of my invention, the small motor, which under such circumstances is driving the press, may be reversed and this reverse movement will uncouple the clutch members 21 and 22. If desired, the clutch may be uncoupled by solenoid 33. When the small motor has been thus disengaged from the driving shaft, the cylinders of the press may be turned back by hand. It will be noted that the shaft 6 turns freely within the hollow shaft 15 without bearing thereon, so that when the larger motor is driving the press alone, the shaft 6 is entirely free from the transmission devices associated with the small motor.

We claim:

1. The combination with two shafts, one being hollow and the other arranged within the hollow shaft, separate driving means connected with said shafts, one adapted to drive its shaft at a higher speed than the other, and a clutch interposed between said shafts comprising clutch members, which automatically disengage when a given speed is reached.

2. The combination with two shafts, one being hollow and the other arranged within the hollow shaft, separate driving means connected with said shafts, one adapted to drive its shaft at a higher speed than the other, and a clutch interposed between said shafts comprising clutch members, one of which is fixed on one of said shafts, and the other feathered on and slidable on the other shaft, the engaging parts of said clutch members being formed so that they are automatically separated by a difference in speed.

3. The combination with two shafts, one being hollow and the other arranged within the hollow shaft, separate driving means connected with said shafts, one adapted to drive its shaft at a higher speed than the other, a clutch interposed between said shafts comprising clutch members, one of which is fixed on one of said shafts and the other feathered and slidable on the other shaft, the engaging parts of said clutch members being formed so that they are automatically separated by a difference in speed, and means for arbitrarily shifting said feathered clutch member longitudinally of its shaft.

4. The combination with a hollow shaft, of a motor connected therewith, a shaft arranged within said hollow shaft, a motor connected with the latter, said last mentioned motor adapted to drive its shaft at a higher rate of speed than the former, a clutch connecting said shafts, comprising clutch members adapted to transmit power from the low speed shaft to the other, when the shafts are revolving in one direction but not vice versa.

5. The combination with a hollow shaft, of a motor connected therewith, a shaft within said hollow shaft, a motor connected with the latter, said last mentioned motor being adapted to drive its shaft at a higher rate of speed than the first named motor and a clutch connecting said shafts, comprising a clutch member fixed on the hollow shaft, and a clutch member feathered and slidable on the inner shaft, said clutch members having teeth so formed as to transmit power from the hollow shaft to the inner shaft, when the shafts are running in one direction, but to cause said clutch members to separate when the speed of the inner shaft exceeds that of the outer.

JOHN J. McGUIRE.
HARRY H. GRAHAM.

Witnesses:
P. H. TRUMAN,
JOSEPH HOLINTSKY.